United States Patent Office 3,537,067
Patented Oct. 27, 1970

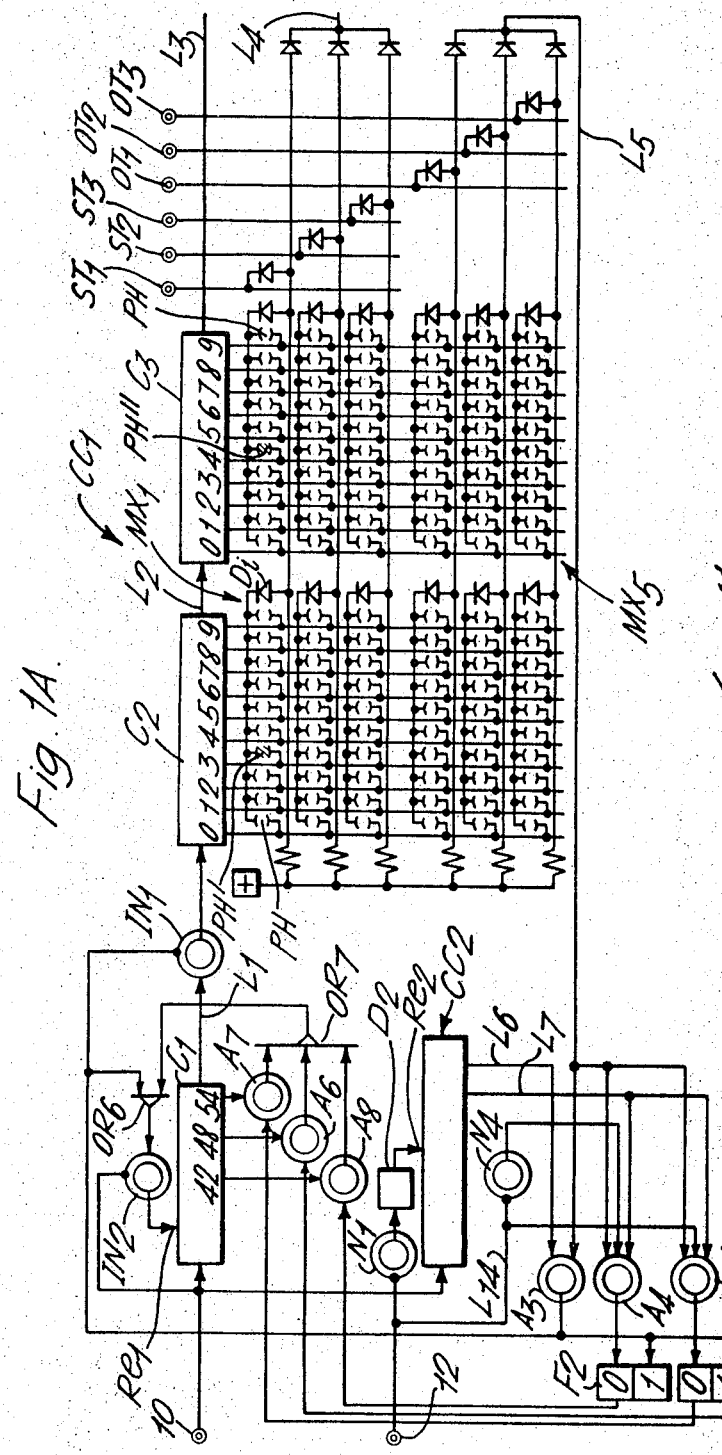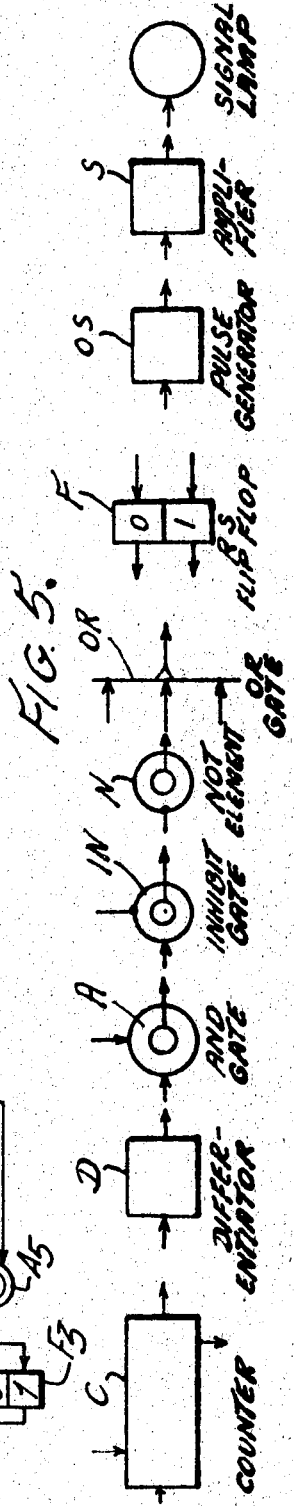

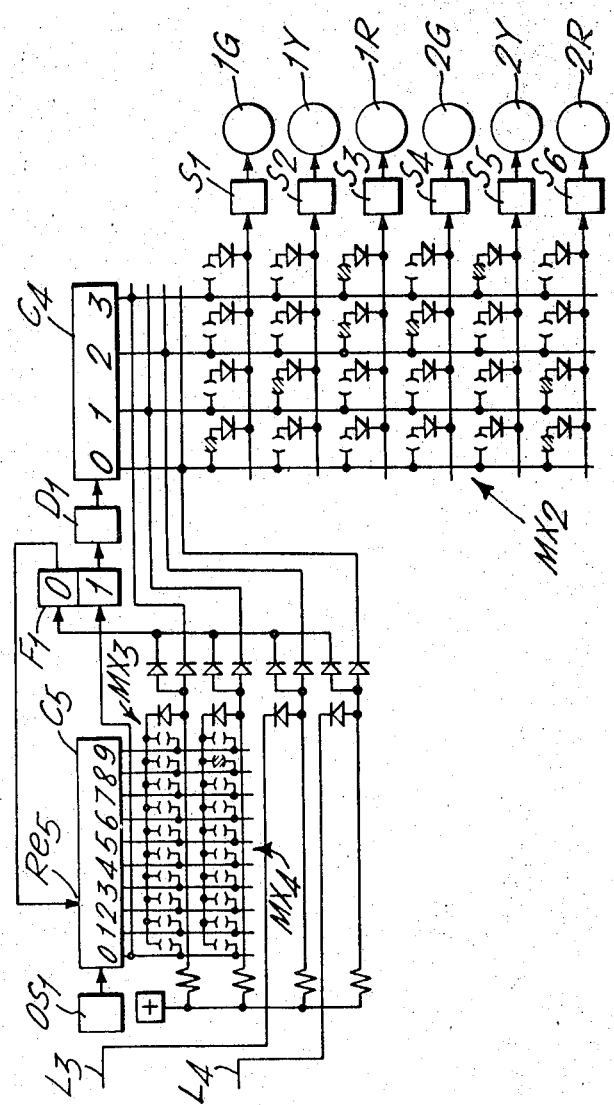

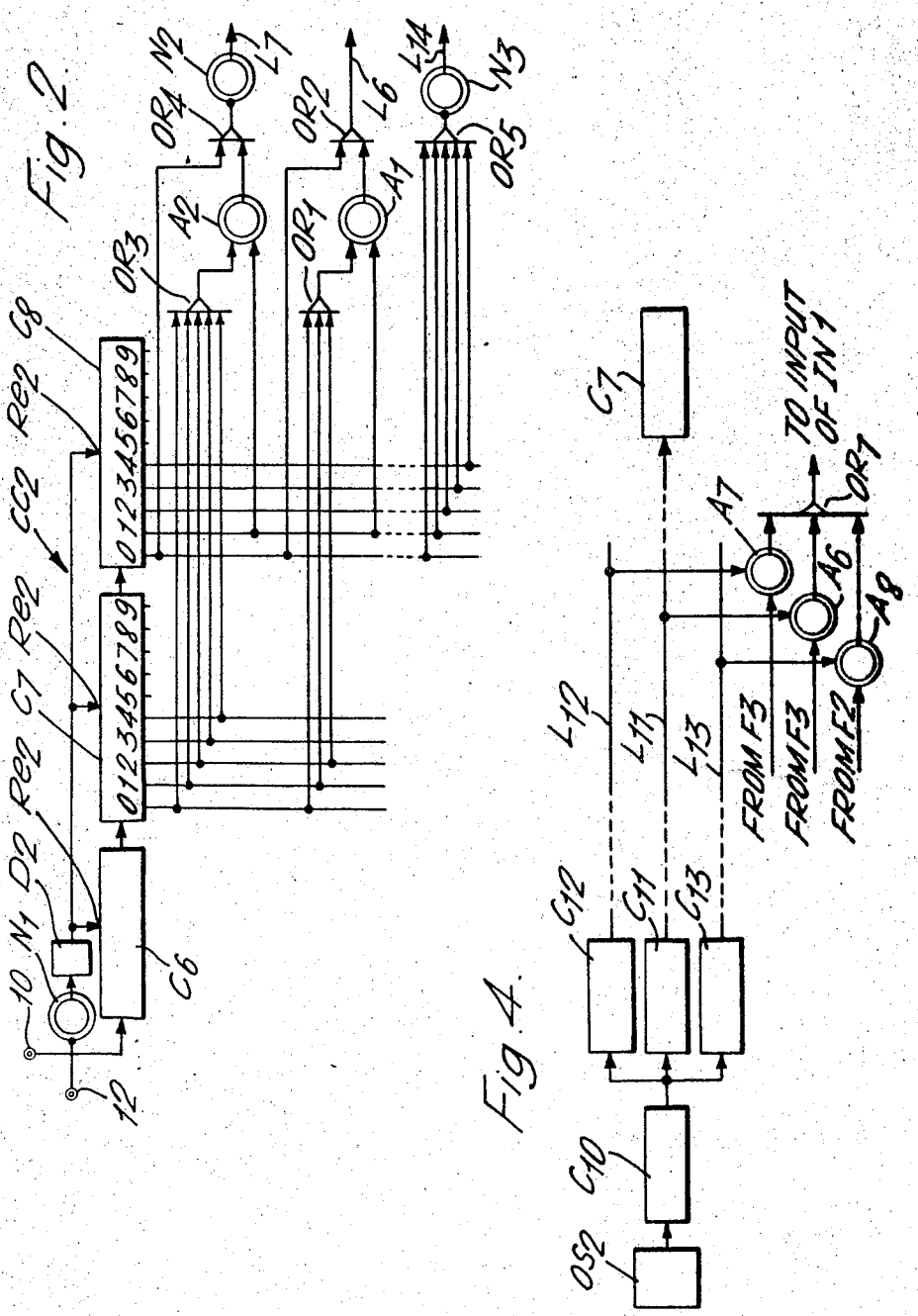

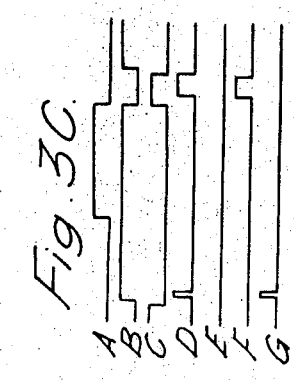
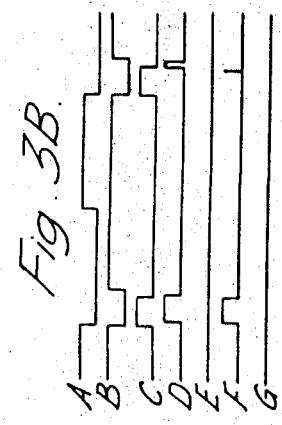
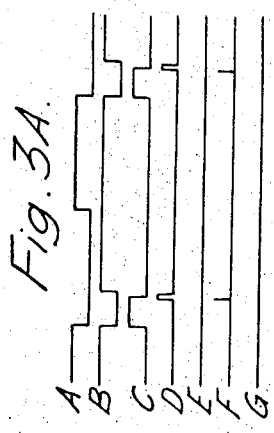
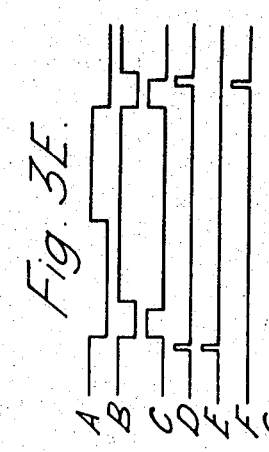
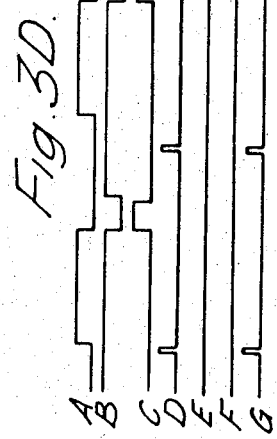
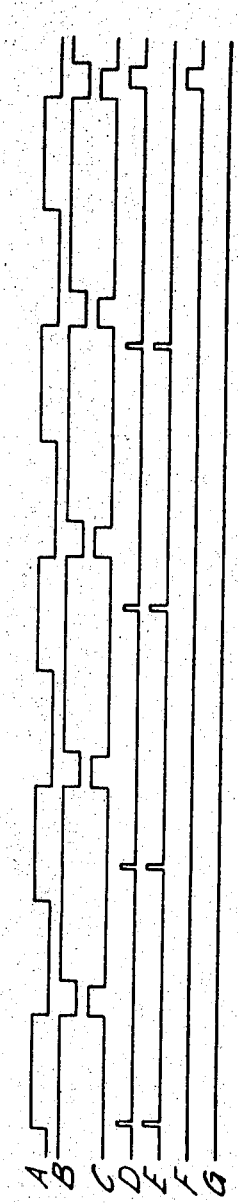
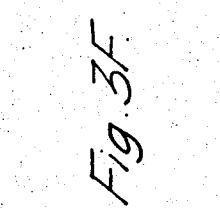

3,537,067
OFFSET CONTROL SYSTEM FOR
TRAFFIC SIGNAL
Morio Ishikawa and Tadao Endo, Kyoto, Japan, assignors to Omron Tateisi Electronics Co., Kyoto, Japan, a company of Japan
Filed July 24, 1967, Ser. No. 655,515
Claims priority, application Japan, July 29, 1966, 41/49,951
Int. Cl. G08g 1/07
U.S. Cl. 340—40          7 Claims

ABSTRACT OF THE DISCLOSURE

An offset control system for a local traffic controller for a set of traffic signals at an intersection. The local controller is normally supplied with clock pulses from a master controller, the clock pulses being divided down by a first counter circuit including first and second counters which provide one carry pulse to the local lamp switching circuitry for every signal cycle. When it is desired to change the offset of the local signal cycle with respect to the cycle of a synchronizing signal sent out by the master controller, the master controller issues an offset selection signal which is combined with the outputs of the second counter in a matrix to provide an offset signal whose cycle relative to that of the synchronizing signal indicates a new offset. A second counter circuit also divides the clock pulses to provide output signals dividing the cycle of the synchronizing signal into three parts. Suitable gating circuitry is provided to combine the offset signal, the output signals from the second counter circuit, and the synchronizing signal to control the operation of the first counter. When the offset signal first occurs within the first time period, means are provided to inhibit the operation of the first counter until the offset signal again coincides with the synchronizing signal. When the offset signal first occurs within the second time period, the count of the first counter is shortened until the offset signal again coincides with the synchronizing signal. When the offset signal first occurs within the third time period, the count in the first counter is elongated until the offset signal again coincides with the synchronizing signal. In this manner, the carry pulse supplied to the lamp switching circuitry is gradually moved in time to the new offset without abrupt or discontinuous operation.

This invention provides an offset control system for traffic signal, wherein the change from the old to a new offset is gradually performed by elongating or shortening the signal cycle and repeating the elongated or shortened cycle until the new offset is attained, and wherein the repetitions are as few as possible.

A coordinated traffic signal control system includes a master controller and a plurality of local controllers at different intersections in the system which are systematically controlled by the master controller. Generally, the master controller sends the local controllers in the system synchronizing signals so that each local controller is operated to start its signal cycle a predetermined period of time after it has received a synchronizing signal. This period is commonly referred to as "offset."

As traffic condition changes, it becomes necessary to change the offset presently followed in each local controller to another offset so as to render the traffic flow through the main street as smooth as possible. Such offset change is generally controlled by the master controller. When the offset is to be changed, however, an abrupt change of the signal indication in accordance with a new offset would certainly cause much disturbance and confusion to traffic. Therefore, it is necessary to gradually change from the old to the new offset.

The primary object of the invention is to provide an offset control system for traffic signal, in which the change from the old to a new offset is gradually performed by shortening or elongating the signal cycle and repeating the shortened or elongated cycle until the new offset is attained, after which the normal signal cycle is restored.

Another object of the invention is to provide such an offset control system for traffic signal as aforesaid, in which the repetitions of the temporarily shortened or elongated signal cycle are as few as possible.

Other objects, features and advantages of the invention will be better understood from the following description of preferred embodiments thereof with reference to the accompanying drawings, wherein:

FIG. 1A and 1B are combined to show a circuit diagram of a local controller;

FIG. 2 is a detailed circuit diagram of a portion of FIG. 1, illustrating a circuit for detecting in what portion of the synchronizing signal cycle each offset signal is produced;

FIGS. 3A to 3F are time charts for explanation of the operation of the system, showing the waveforms of different signals appearing in different parts of the system;

FIG. 4 is a circuit diagram of a different embodiment of the signal cycle varying means shown in FIG. 1; and FIG. 5 is a block diagram explaining the symbology of FIGS. 1–4.

Referring in detail to FIG. 1, a terminal 10 of the local controller receives a cycle signal from a master controller, not shown which also supplies signals to terminals 12, ST1, ST2, ST3, OT1, OT2, and OT3 of the local controller. The cycle signal may comprise clock pulses, 40 to 120 in number per second. The signal cycle, that is, the period of time from one green signal indication to the next green signal indication, can be changed by changing the number of clock pulses applied per second, as will be understood from the following description. In the present instance, one signal cycle is determined to be equal to the time period during which 4,800 clock pulses are produced.

A terminal 12 of the local controller receives a synchronizing signal from the master controller, the cycle of which is equal to the signal cycle. In the illustrated embodiment, the synchronizing signal has a pulse which is in phase with the nominal signal cycle of 4,800 clock pulses and which appears during the latter half of each cycle.

While considering the diagrams in FIGS. 1–4, reference should be made to FIG. 5 which includes a tabulation of the relation between the logic element discussed and the symbol used therefor.

The clock pulses applied to the terminal 10 are counted by a pulse counter C1. This counter has output terminals 42, 48 and 54 at which an output appears when 42, 48 and 54 input clock pulses have been mounted, respectively. The counter C1 also has an output line L1 at which a carry pulse is produced when the counter is reset. In the following pages, when the counter C1 operates to produce one carry pulse for every 48 input pulses, it will be referred to as functioning normally or functioning in capacity A; when it operates to produce one carry pulse for every 42 input pulses, it will be referred to as functioning in capacity B; and when it operates to produce one carry pulse for every 54 input pulses, it will be referred to as functioning in capacity C.

The carry pulses from the counter C1 are applied through the line L1 and an INHIBIT element IN1 to the input of a counter C2. The counter C2 is combined with a counter C3 to form a counter circuit CC1. The counters are both decimal counters, with the carry pulses from the counter C2 being applied to the input of the latter counter C3 through a line L2. Consequently, when 100 pulses have been counted by the counter CC1, it produces one carry pulse. In other words, when 4,800 pulses have been counted by the counter C1 functioning normally, one pulse appears on a line L3.

A "split" setting matrix MX1 is connected to the output terminals of the counters C2 and C3. The "split" is defined as "the percentage of the time period of the green signal indication to one signal cycle." The matrix MX1 comprises three pinboards each having a plurality of pinholes PH each connected to one of the output terminals of the counters C2 and C3. Each pinboard has a terminal ST1, ST2 and ST3 to which a "split" selection signal is applied from the master controller. Simply, the terminal to which the split selection is applied determines which of the three pin boards in matrix MX1 is operative. A split is selected by inserting a pin into the pinholes. For example, if a pin is inserted into the pinhole PH' connected to the output terminal 3 of the counter C2 and another pin, in the pinhole PH'' connected to the output terminal 4 of the counter C3, an output appears on a line L4 when the counter CC1 has counted 43 input pulses from the line L1 and the split selection signal appears at terminal ST1. In this case, the split has been selected to be 43% of the full signal cycle length.

Thus, the signal appearing on line L3 has a periodicity equal to the signal cycle, or, in other words, one pulse appears for every cycle. The signal appearing on line L4 also has a periodicity equal to the signal cycle, but is shifted in time by an amount determined by "split" setting matrix M51. The apparatus illustrated in FIG. 1B provides a means for converting the signals on lines L3 and L4 into switching the signal lamps associated with the local controller.

Now referring to FIG. 1B, at each intersection, green, amber and red signal lamps 1G, 1Y and 1R face the main street, and similar lamps 2G, 2Y and 2R, the cross street. The lamps are successively turned on and off in accordance with a predetermined sequence, which is controlled by a quaternary counter C4. To the output terminals of the counter C4 is connected a matrix MX2 having six pinboards each comprising diodes and pinholes. The outputs from the pinboards are applied through amplifiers S1–S6 to the signal lamps 1G, 1Y, 1R, 2G, 2Y and 2R, respectively.

Suppose that a pin is inserted in the pinholes as shown hatched in FIG. 1B. When an output appears at the output terminal 0 of the counter C4, the lamps 1G and 2R are turned on; when an output appears at the terminal 1, the lamps 1Y and 2R are turned on; when an output appears at the terminal 2, the lamps 1R and 2G are turned on; and when an output appears at the terminal 3, the lamps 1R and 2Y are turned on. The input to the counter C4 is differentiated pulses from a differentiator D1 whose input comprises the reset outputs of a flip-flop F1.

A decimal counter C5 is provided to determine the period of time during which the amber signal indications last. A pulse generator OS1 applies pulses to the counter C5, the carry pulses of which are applied as reset input signals to the flip-flop F1. Two matrices MX3 and MX4 each including ten pinholes and diodes are connected to the output terminals of the counter C5. The upper matrix MX3 determines the time period of the cross street amber signal indication 2Y, while the lower matrix MX4, the time period of the main street amber signal indication 1Y.

When a signal appears at that one output terminal of the counter C5 connected to the pinhole of the matrix MX3 which has a pin inserted thereinto, and if this signal coincides with the output at the terminal 3 of the counter C4, a set input signal is applied to the set or 0 section of the flip-flop F1. Similarly, when a signal appears at that one output terminal of the counter C5 connected to the pinhole of the matrix MX4 which has a pin inserted thereinto, and if this signal coincides with the signal at the output terminal 1 of the counter C4, a set input is also applied to the flip-flop F1. When the signal on the line L3 coincides with the output at the terminal 2 of the counter C4, or when the signal on the line L4, with the output at the terminal 0 of the counter C4, a set input is also applied to the 0 section of the flip-flop F1. The set output from the flip-flop F1 is applied to the reset terminal Re5 of the counter C5. The output at the output terminal 0 of the counter C5 is applied as a reset input to the reset or 1 section of the flip-flop F1.

Suppose that the counter C4 produce an output at its terminal 2. Under the condition the lamps 1R and 2G are on. If this output coincides with the signal on the line L3, the flip-flop F1 is set, the set output of which resets the counter C5, whereupon the counter C5 produces an output at its terminal 0, which in turn resets the flip-flop F1. The reset output of the flip-flop F1 is applied through the differentiator D1 to the counter C4 to cause the same to make one forward step, shifting the output at the terminal 2 onto the next terminal 3, so that the lamp 2G is turned off and instead the lamp 2Y is turned on, with the lamp 1R being kept on.

When the flip-flop F1 has been reset, its set output applied to the reset terminal Re5 of the counter C5 has been removed, so that the counter has begun to count the input pulses from the generator OS1, until an output appears at that one output terminal of the counter C5 connected to the pinhole of the matrix MX3 which has a pin inserted thereinto, whereupon the flip-flop F1 is set. As a result, the counter C5 is reset to produce an output at its output terminal 0. This output resets the flip-flop F1, the reset output of which is differentiated and causes the counter C4 to shift its output from the terminal 3 back to he terminal 0, thereby turning the lamps 1R and 2Y off, and 1G and 2R on. It will be seen that the matrix MX3 determines the duration of the amber signal indication 2Y.

Under the condition that the output is appearing at the terminal 0 of the counter C4, when the split signal has appeared on the line L4, the flip-flop F1 is set again, so that the counter C5 is reset to produce an output at the terminal 0. This output resets the flip-flop F1, the reset output of which makes the counter C4 to shift its output from the terminal 0 to the next terminal 1, thereby turning the 1G off and the lamp 1Y on, while keeping the lamp 2R on. It will be seen that the split signal determines the duration of the green signal indication 1G.

When the flip-flop F1 has been reset, the counter C5 has begun to count the input pulses, until an output appears at that output terminal connected to the pinhole of the matrix MX4 which has a pin inserted therein (the matrix MX3 does not operate at this time since there is no output at the terminal 3 of the counter C4), whereupon the matrix MX4 produces an output which coincides with the output at the terminal 1 of the counter C4, thereby applying a set input to the flip-flop F1. The set output of this flip-flop resets the counter C5 to produce an output at its terminal 0. This causes the counter C4 to shift its output from the terminal 1 to the terminal 2, thereby turning the lamps 1Y and 2R off and the lamps 1R and 2G on. Thus, the original condition of signal indication has been restored. It will be easily seen that the matrix MX4 determines the duration of the amber signal indication 1Y, and that the next signal cycle will begin with the appearance of a signal on the line L3.

As previously mentioned, normally the cycle of the signal on the line L3 corresponds to 4,800 pulses at the terminal 10. If the counter C1 functions in capacity B, however, a signal appears upon application of every 4,200 pulses to the terminal. This means that now the signal cycle length has been shortened by 12.5%. On the other hand, if the counter C1 functions in capacity C, one signal appears on the line L3 for every 5,400 pulses applied to the terminal 10. This means that the signal cycle has been elongated by 12.5%.

Now will be the time to explain about the offset change in accordance with the invention. First, an offset is selected in the following manner.

A matrix MX5 of the same construction of the matrix MX1 is connected to the output terminals of the counters C2 and C3. Since the matrix MX5 includes three pinboards, three different offsets are selectively available. Which of the three offsets is selected is determined by which of the three terminals OT1, OT2 and OT3 receives an offset selection signal from the master controller. Each of the terminals OT1–OT3 is connected through a diode to the output of one of the three pinboards. For example, when the signal applied to the terminal OT1 coincides with the output of the uppermost pinboard, a signal appears on a line L5. As in the case of the matrix MX1, the time when the pinboard produces an output signal is determined by which of the pinholes has a pin inserted thereinto. In other words, when the counter C2 or C3 produces an output at that output terminal connected to the pinhole of a pinboard which has a pin inserted thereinto, that pinboard produces an output on the line L5. This signal will be called an offset signal, and normally is in synchronism with the synchronizing signal. Here, the offset is the period from when a signal appeared on the line L5 to when a signal has appeared on the line L3, and is set as a percentage of a full signal cycle.

The cycle signal at the terminal 10 is applied also to the counter CC2. The synchronizing signal at terminal 12 is applied through a NOT element N1 and a differentiator D2 to reset terminal $Re2$ of counter CC2. Mention has already been made that the synchronizing signal appears only during the latter half of the signal cycle. Thus, during the first half cycle of the synchronizing signal, no input is applied to the NOT element N1, which then produces an output. This output is differentiated at D2 to reset the counter CC2 at the start of each cycle of the synchronizing signal. It should be noted that hereinafter the signal cycle should be distinguished from the cycle of the synchronizing signal. For although the cycle of the synchronizing signal remains constant, the signal cycle, as viewed at terminal L3, is elongated or shortened with respect thereto. The counter CC2 is so designed that a signal exists on a line L6 for the first 13% of the cycle of the synchronizing signal, while a signal appears on an output line L7 for the full cycle of the signal except the first 15% thereof. The counter CC2 is shown in detail FIG. 2 and comprises three counters C6, C7 and C8. The latter two are decimal counters, while the former one is such that it produces one carry pulse for every 48 input pulses. The carry pulses of the counter C6 are applied to the input of the counter C7, the carry pulses of which are in turn applied to the input of the counter C8. It will be easily understood that 4,800 pulses must be applied to the counter C6 until the counter C8 has been counted up.

The output terminals 0 to 2 of the counter C7 are connected to the input of an OR element OR1, the output of which is applied to one of the two input terminals of an AND element A1, the other input of which is connected to the output terminal 1 of the counter C8. The output of the AND element A1 is applied to one input of an OR element OR2, the other input of which is connected to the output terminal 0 of the counter C8. Consequently, when the counter CC2 has been reset, a signal appears on the line L6 and continues until 48×13 clock pulses at the terminal 10 have been counted by the counter CC2. This means that a signal exists on the line L6 for a period of time corresponding to 13% of the full cycle of the synchronizing signal at the beginning of the cycle.

The output terminals 0 to 4 of the counter C7 are connected to the input of an OR element OR3, the output of which is applied to one of the two input terminals of the AND elements A2, the other input of which is connected to the output terminal 1 of the counter C8. The output at the terminal 0 of the counter C8 is applied to an OR element OR4, to which the output of the AND element A2 is also applied. Consequently, when the counters C6 to C8 have been reset, the OR element OR4 produces an output, which lasts until 48×15 clock pulses have been counted by the CC2. The output of the OR element OR4 is applied through a NOT element N2 to the line L7, so that a signal appears on the line L7 after a period of time corresponding to 15% of the cycle of the synchronizing signal from the beginning of the cycle and exists on the line L7 till the end of the cycle.

Turning back to FIG. 1A, an AND element A3 has its two inputs connected to the lines L5 and L6, respectively; an AND element A4 has its three inputs connected to the lines L5 and L7 and the output of a NOT element N4 to which the synchronizing signal appearing at terminal 12 is applied through a line L4; and an AND element A5 has its three inputs connected to the line L13 and the lines L5 and L7. The output of the AND element A3 is applied through an OR element OR6 and an INHIBIT element IN2 to the reset terminal $Re1$ of the counter C1 and also directly to the inhibit terminal of the INHIBIT element IN1, and to the reset sections 1 of flip-flops F2 and F3. The outputs of the AND elements A4 and A5 are applied to the set sections 0 of the flip-flops F2 and F3, respectively. The reset output of the flip-flop F3 is applied to one input of an AND element A6; the set output of the flip-flop F3, to one input of an AND element A7; and the set output of the flip-flop F2, to one input of an AND element A8. The other inputs of these three AND elements A6, A7 and A8 are connected to the output terminals 48, 54 and 42 of the counter C1, respectively. The output of these AND elements A6, A7 and A8 is applied through an OR element OR7 to the OR element OR6.

Under the normal condition that the flip-flops F2 and F3 remain reset, the reset output of the flip-flop F3 is applied to one input of the AND element A6, so that every time the counter C1 has counted 48 clock pulses, the counter is reset. This means that the signal cycle length at L3 is equal to the time period during which 4,800 clock pulses have been counted, as previously mentioned. Also under the normal condition, the signal on the line L5 (to be referred to as the offset signal) appears upon passage of 13% of the cycle length of the synchronizing signal as shown in FIG. 3A. Under this condition, the offset signal is considered as being in synchronism with the synchronizing signal. It may be mentioned here that in FIGS. 3A to 3F the capital letter A shows the waveform of the synchronizing signal; B, that of the signal on the line L7; C, that of the signal on the line L6; D, that of the offset signal on line L5; and E, F and G, those of the outputs of the AND elements A5, A3 and A4, respectively.

When the offset has been changed, however, the offset signal will not be in synchronism with the synchronizing signal.

Suppose that, upon application of an offset selection signal, the first offset signal happens to be produced on the line L5 while the signal exists on the line L6, that is, within 13% of the cycle length of the synchronizing signal from its beginning, as shown in FIG. 3B. Then, the AND element A3 has its two inputs energized by the two signals, so that it produces an output to be applied as an inhibit signal to the INHIBIT element IN1. So long as the inhibit signal is being applied to the element, the counter CC1 can receive no carry pulses from the counter C1. Consequently, since the counter CC1 does not step forward, the offset signal on the line L5 lasts until the counter CC2 steps forward so that the output on the line L6 disappears upon passage of 13% of the cycle length of the synchronizing signal, whereupon the output of the AND element A3 disappears so that the inhibit signal on the element IN1 is removed. This permits the counter C1 that has been reset to resume counting its input pulses from the terminal 10. When the counter C1 has counted 48 pulses, it produces a carry pulse, which causes the counter CC1 to make one forward step so that the offset signal on the line L5 disappears. After the next cycle of the synchronizing signal, the system progresses normally as shown in FIG. 3B, and each offset signal is produced upon passage of 13% of the cycle of the synchronizing signal from its beginning. Thus, the new offset has been achieved.

Suppose that upon application of an offset selection signal, the first offset signal happens to be produced within the period from the first 15% to 50% of the cycle of the synchronizing signal, as shown in FIGS. 3C and 3D. In FIG. 3C, the offset signal is produced relatively early within the period, that is, relatively soon after a signal appeared on the line L7, while in FIG. 3D it is produced near the end of that period (the first half cycle of the synchronizing signal). In either case, during that period no input is applied to the terminal 12, so that there is an output from the NOT element N4, while an output exists on the line L7. Under the condition, when the first offset signal has appeared on the line L5, the AND element A4 produces an output to set the flip-flop F2, the set output of which is applied to one of the two input terminals of the AND element A8. When the counter C1 has counted 42 clock pulses, it produces an output to be applied to the other input of the AND element A8, the output of which resets the counter. This means that the counter C1 now functions in capacity B, producing one carry pulse for every 42 input pulses. As a result, every time 4,200 pulses has been applied to the terminal 10, one pulse appears on the line L3. Since the sginal cycle is the cycle in which a signal appears on the line L3, it has now become shorter by 600 pulses or 12.5% than it was under the previously mentioned normal condition. It will be easily understood that the shortened cycle length is now 87.5% of the normal length. As the shortened cycle is repeated (once in the case of FIG. 3C), the offset signal lasts until the signal on the line L6 disappears as in the case of FIG. 3B. When the two signal coincides, the AND element A3 produces an output to reset the flip-flop F2, thereby removing its set output from the input of the AND element A8. At this time the flip-flop F3 is in its reset condition applying its reset output to the AND element A6. This means counter C1 has been restored to its normal capacity A, producing one carry pulse for every 48 input pulses. Then, when the signal on the line L6 disappears, the counter C1 begins counting operation and at the same time the inhibit signal on the inhibit element IN1 is removed, whereby when the counter C1 has counted 48 pulses, the counter CC1 makes one forward step so that the offset signal disappears. Thus, the offset signal has come to be in synchronism with the synchronizing signal.

In FIG. 3D, the operation is the same as in FIG. 3C, except that the shortened cycle is here repeated three times until the normal condition has been restored. However, the repetition does not exceed three times since upon repetition the shortened cycle is further shortened by 12.5% (that is, 4,800−4,200=600 pulses) and the maximum to be shortened is 50%−15%=35%.

Suppose that upon application of the offset selection signal, the first offset signal occurs on the line L5 within the latter half of the synchronizing signal cycle. In FIG. 3E, the first offset signal is produced near the end of the half cycle, while in FIG. 3F it is produced near the beginning thereof. During the latter half cycle of the synchronizing signal, this signal applies an input to one of the three input terminals of the AND element A5, and the signal on the line L7 is also being applied to the second input terminal of the AND element. Under the condition, when the first offset signal has appeared on the line L5 to be applied to the third input terminal of the AND element A5, this AND element produces an output to set the flip-flop F3, the set output of which is applied to one of the two input terminals of the AND element A7. At the same time the reset output of the flip-flop F3 has been removed and the flip-flop F2 remains reset so that the other AND elements A6 and A8 have their respective one input kept deenergized. Consequently, every time the counter C1 has counted 54 input pulses, the AND element A7 produces an output to reset the counter. The counter now functions in capacity C, and one signal appears on the line L3 for every 5,400 pulses at the terminal 10. This means that the signal cycle has been elongated by 12.5% of the normal length of 4,800 pulses. As the elongated cycle is repeated (only once in FIG. 3E), the offset signal comes to coincide with the signal on the line L6. The operation thereafter is the same as in FIG. 3B. In FIG. 3F, the operation is the same as in FIG. 3E except that the elongated cycle is repeated more than once until the same result has been attained as in FIG. 3E. However, the repetition does not exceed four times.

Thus, in accordance with the invention, when the offset is to be changed, the signal cycle is shortened or elongated by 12.5% of the cycle length, depending upon in which of the three different ranges or periods in one cycle of the synchronizing signal the first offset signal after application of the offset selection signal has appeared, so that the shortened or elongated cycle is repeated as less often as possible until the signal cycle becomes equal again to the cycle of the synchronizing signal.

Under the normal condition that the counter C1 is functioning in capacity A, producing one carry pulse for every 48 input pulses, the cycle of the input pulses to the counter CC1 is 1% (48 clock pulses at the terminal 10) of the cycle length (4,800 pulses) of the synchronizing signal. Since the offset signal on the line L5 lasts from one to the next input pulse to the counter CC1, the pulse width of the offset signal is also 1% of the synchronizing signal cycle length. Mention has already been made that the offset signal is considered as being in synchronism with the synchronizing signal when the former is produced upon passage of 13% of the synchronizing signal cycle. However, in view of the 1% pulse width of the offset signal and possible introduction of various error signals into the system, it is practical to consider the offset signal as being in synchronism with the synchronizing signal so long as the offset signal is produced within a predetermined tolerable period after the end of the above 13% of the synchronizing signal cycle length. In the illustrated embodiment, this period is 2% of the synchronizing signal cycle length, with a 1% tolerance. With this arrangement, if an offset signal appears within the 2% period, the AND elements A3, A4 and A5 do not produce any output. Consequently, the flip-flop F3 remains at its reset condition, so that the counter C1 operates normally.

In case the synchronizing signal from the master controller is applied to each local controller in the form of, for example, 3% off-pulses, it is necessary for each local controller to produce a signal which can distinguish between the first and latter halves of each cycle of the synchronizing signal. To this end, for example, the output terminals 0 to 4 of the counter C8 (FIG. 2) are connected to the input of an OR element OR5, the output of which is connected to the input of a NOT element N3. With this arrangement, the NOT element N3 produces no output until the counter CC2 has counted 48×50 input pulses, which is half the synchronizing signal cycle length, whereupon the NOT element N3 produces an output for the next half of the synchronizing signal cycle. The output of the NOT element N3 is applied as an input to the NOT element N4 and the AND element A5 (FIG. 1A), with the input line L14 having been disconnected from the terminal 12, for the same operation of the system as in the previously mentioned case.

The counter C1 of each local controller may be replaced by a pulse generator OS2, counters C10, C11, C12 and C13 provided in the master controller, as shown in FIG. 4. The counters C10, C11, C12 and C13 are hexal, octal, nonary and heptal counters, respectively. The pulse generator OS2 produces a series of clock pulses which are applied to the counter C10, the carry pulses of which are applied to the other three counters at the same time. The carry outputs of the counters C11, C12 and C13 are applied through lines L11, L12 and L13 as one input to the AND elements A6, A7 and A8 of FIG. 1A, respectively. It will be easily seen that one pulse appears on the lines L11, L12 and L13 for every 48, 54 and 42 input pulses to the counter C10, and that the group of counters can perform the same function as the counter C1. The output of the OR element OR7, in this case, is applied to the input of the INHIBIT element IN1. With the arrangement of FIG. 4, the counter C1, the INHIBIT element IN2 and the OR element OR6 in each local controller can be dispensed with to attain simplification of the system. If the output line L11 of the counter C11 is connected to the input of the counter C7 (FIG. 2) in each local controller, the counter C6 can also be dispensed with.

Having illustrated and described some preferred embodiments of the invention, it is understood that they are merely representative and that there are many modifications and changes without departing from the scope of the invention as defined in the appended claims.

What we claim is:

1. An offset control system for use in a traffic control system including a master controller providing a series of clock pulses and a synchronizing signal having a periodicity equal to a desired signal cycle, and at least one local controller comprising:
   (a) first means for counting the clock pulses from the master controller to produce a plurality of pulses occurring in a predetermined cycle;
   (b) second means for counting said pulses occurring in a predetermined cycle to produce a sequence of output pulses, and a carry pulse for every predetermined number of input pulses thereto;
   (c) an offset selection circuit means connected to the output pulses of said second pulse counting means and adapted to select a different offset by producing an offset signal;
   (d) a plurality of signal lamps adapted to be turned on and off in accordance with a signal cycle which is determined by the periodicity of the carry pulses produced by said second pulse counting means;
   (e) means for providing within each cycle of the synchronizing signal a first signal defining a first period starting with the initiation of the synchronizing signal cycle and terminating within the first half-cycle thereof, a second signal defining a second period occupying the rest of said first half-cycle, and a third signal defining a third period occupying the latter half-cycle thereof, said offset signal normally being produced upon passage of said first period;
   (f) means having said first signal and said offset signal connected thereto and inhibiting the application of pulses to said second pulse counting means when said offset signal is produced within said first period of the synchronizing signal cycle;
   (g) means having said second signal and said offset signal connected thereto and shortening the cycle of said input pulses to said second pulse counting means by controlling said first counting means when said offset signal is produced within said second period of the synchronizing signal cycle; and
   (h) means having said third signal and said offset signal connected thereto and elongating the cycle of input pulses supplied to said second pulse counting means by controlling said first pulse counting means when said offset signal is produced within said third period of the synchronizing signal cycle.

2. The system as recited in claim 1, wherein:
   (a) the ratio of said shortening of the cycle of input pulses to the synchronizing signal cycle equals the ratio of said elongating of the cycle of input pulses to the synchronizing signal cycle, and
   (b) the ratio of said first period to the synchronizing signal cycle is greater than either of said former ratios.

3. The system as recited in claim 2, wherein said latter ratio is 15% of the synchronizing signal cycle, while said former ratios are 12.5% thereof.

4. The system as recited in claim 1 further including:
   (a) means having the synchronizing signal coupled thereto and furnishing within each cycle of the synchronizing signal is a fourth period extending into said second period; and
   (b) means for preventing the operation of said shortening means so long as said offset signal exists within said fourth period.

5. The system as recited in claim 4, wherein the overlap of said fourth and second periods is greater than the pulse width of said offset signal.

6. The system as recited in claim 4, wherein said first period comprises 13% of the synchronizing signal cycle, said offset signal's pulse width comprises 1% thereof, and said fourth period starts with said first period and comprises 15% of the synchronizing signal cycle.

7. The system as recited in claim 1, wherein said first pulse counting means comprises:
   (a) a first counter producing output pulses from the clock pulses having a cycle proportional to a desired signal cycle;
   (b) a second counter producing output pulses from the clock pulses having a cycle shorter than the cycle of said first counter;
   (c) a third counter producing output pulses from the clock pulses having a cycle longer than the cycle of said first counter; and
   (d) means for connecting said first, second and third counters to said inhibiting, shortening, and elongating means to respectively inhibit, shorten and elongate the cycle of pulses supplied to said second pulse counting means in response thereto.

References Cited

UNITED STATES PATENTS 3,252,133    5/1966    Aver et al. _ _ _ _ _ _ _ _ _ _ _ 340—40

ALVIN H. WARING, Primary Examiner

C. MARMELSTEIN, Assistant Examiner